US009979754B2

(12) United States Patent
Mendiratta et al.

(10) Patent No.: US 9,979,754 B2
(45) Date of Patent: May 22, 2018

(54) EMERGENCY CALL BACK FOR SESSION INITIATION PROTOCOL SESSIONS

(71) Applicant: Avaya Inc., Santa Clara, CA (US)

(72) Inventors: Harsh V. Mendiratta, East Brunswick, NJ (US); Manish Chatterjee, Calcutta (IN); Purnendu Dhal, Rourkela (IN)

(73) Assignee: Avaya Inc., Santa Clara, CA (US)

( * ) Notice: Subject to any disclaimer, the term of this patent is extended or adjusted under 35 U.S.C. 154(b) by 139 days.

(21) Appl. No.: 15/053,160

(22) Filed: Feb. 25, 2016

(65) Prior Publication Data

US 2017/0251027 A1 Aug. 31, 2017

(51) Int. Cl.
*H04L 29/06* (2006.01)
*H04W 36/00* (2009.01)
*H04L 29/12* (2006.01)
*H04W 4/22* (2009.01)
*H04W 76/02* (2009.01)

(52) U.S. Cl.
CPC ........ *H04L 65/1006* (2013.01); *H04L 61/103* (2013.01); *H04W 4/22* (2013.01); *H04W 36/0011* (2013.01); *H04W 76/027* (2013.01)

(58) Field of Classification Search
CPC ............. H04L 65/1006; H04L 61/103; H04W 76/027; H04W 4/22; H04W 36/0011
See application file for complete search history.

(56) References Cited

U.S. PATENT DOCUMENTS

| 8,289,958 | B1* | 10/2012 | Narayanan | H04L 12/66 370/352 |
| 8,401,003 | B1* | 3/2013 | Petit-Huguenin | H04L 12/66 370/352 |
| 2005/0083911 | A1* | 4/2005 | Grabelsky | H04Q 3/0025 370/352 |
| 2007/0270164 | A1* | 11/2007 | Maier | H04W 64/00 455/456.2 |
| 2008/0298799 | A1* | 12/2008 | Takihiro | H04L 12/2861 398/2 |
| 2009/0003312 | A1* | 1/2009 | Velazquez | H04M 3/5116 370/352 |
| 2009/0186595 | A1 | 7/2009 | Son et al. | |
| 2010/0172345 | A1 | 7/2010 | Bjorsell et al. | |
| 2012/0129482 | A1 | 5/2012 | Li et al. | |

(Continued)

OTHER PUBLICATIONS

U.S. Appl. No. 15/053,087, filed Feb. 25, 2016, Chatterjee.

(Continued)

*Primary Examiner* — Min Jung
(74) *Attorney, Agent, or Firm* — Sheridan Ross P.C.

(57) ABSTRACT

An Address Resolution Protocol (ARP) process receives a first Internet Protocol (IP) address that is associated with a Media Access Control (MAC) address of a communication endpoint. A first Session Initiation Protocol (SIP) INVITE for an emergency call request is received from the communication endpoint. The ARP process receives a second IP address that is associated with the MAC address of the communication endpoint. A second SIP INVITE is received that is a request for an emergency call back. The second SIP INVITE is routed to the communication endpoint based on the second IP address associated with the MAC address of the communication endpoint to reestablish the emergency call with the communication endpoint.

20 Claims, 2 Drawing Sheets

(56) References Cited

U.S. PATENT DOCUMENTS

| | | | |
|---|---|---|---|
| 2013/0003698 A1* | 1/2013 | Olvera-Hernandez | H04W 8/082 370/331 |
| 2013/0203376 A1 | 8/2013 | Maier et al. | |
| 2016/0065748 A1* | 3/2016 | Li | H04M 11/04 379/45 |
| 2016/0366574 A1* | 12/2016 | Dahan | H04W 4/22 |

OTHER PUBLICATIONS

Plummer, "An Ethernet Address Resolution Protocol or Converting Network Protocol Addresses to 48.bit Ethernet Addresses for Transmission on Ethernet Hardware," Network Working Group RFC826, 1982, 10 pages.

Bradley et al., "Inverse Address Resolution Protocol," Network Working Group RFC 2390, 1998, 10 pages.

* cited by examiner

EMERGENCY CALL BACK FOR SESSION INITIATION PROTOCOL SESSIONS

TECHNICAL FIELD

The disclosure relates generally to communication systems and particularly to emergency communication systems.

BACKGROUND

Typically, emergency calls have special regulations requiring enterprise communication servers to build special logic to handle emergency calls. For instance, unlike regular calls, which are not allowed to be made until a user registers with proper credentials, emergency calls must be allowed to proceed even if the user has not registered. The enterprise communication infrastructure must ensure that a Public Safety Access Point (PSAP), such as a 911 call center, be able to callback the emergency caller if the call gets disconnected for whatever reason. These two requirements have been addressed for desk-phone devices in an enterprise. However, for mobile devices or devices that use dynamic Internet Protocol (IP) addresses, the emergency call back feature may not always work properly.

BRIEF SUMMARY

These and other needs are addressed by the various embodiments and configurations of the present disclosure. An Address Resolution Protocol (ARP) process receives a first Internet Protocol (IP) address that is associated with a Media Access Control (MAC) address of a communication endpoint. A first Session Initiation Protocol (SIP) INVITE for an emergency call request is received from the communication endpoint. The ARP process receives a second IP address that is associated with the MAC address of the communication endpoint. A second SIP INVITE is received that is a request for an emergency call back. The second SIP INVITE is routed to the communication endpoint based on the second IP address associated with the MAC address of the communication endpoint to reestablish the emergency call with the communication endpoint.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
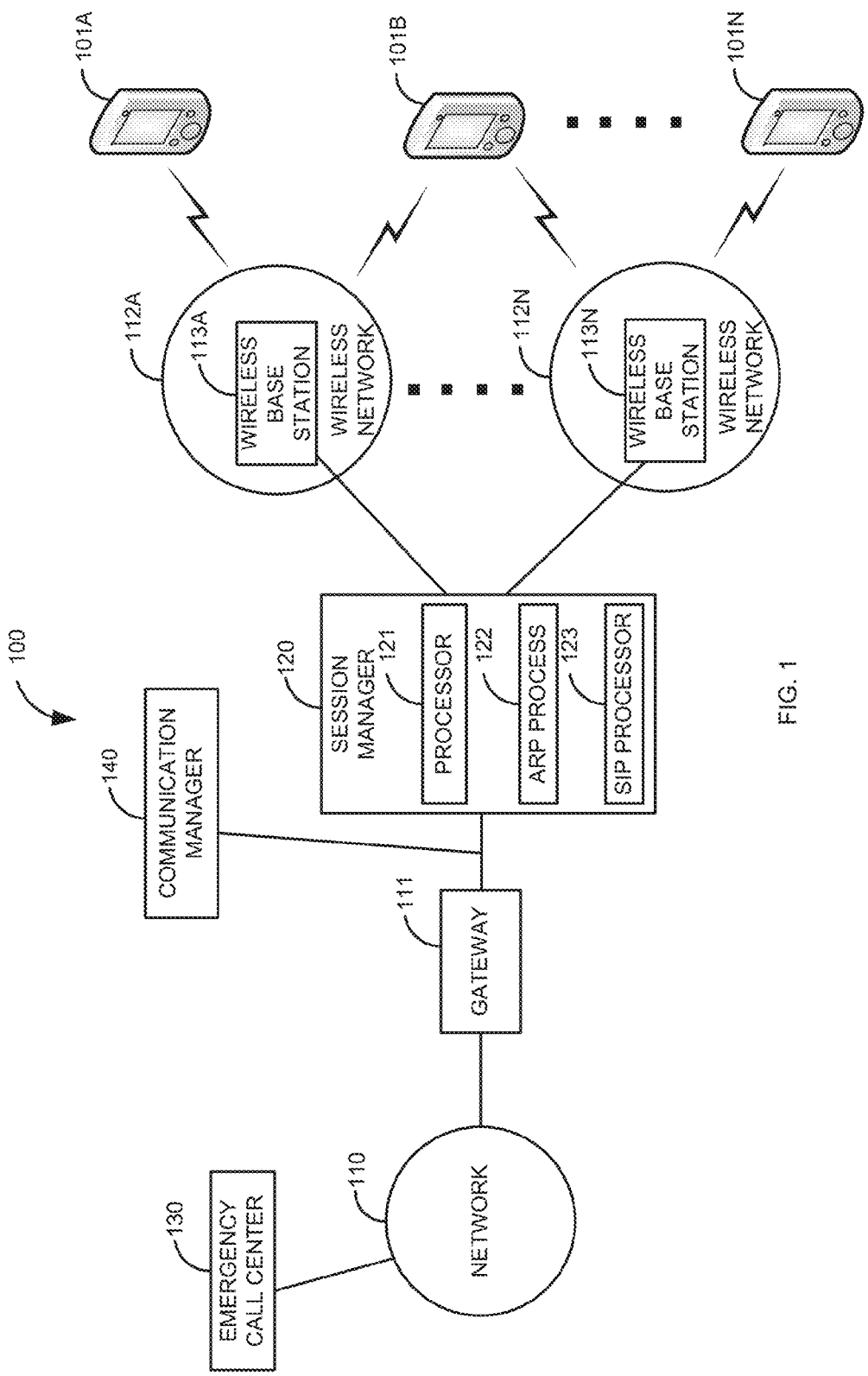
FIG. 1 is a block diagram of a first illustrative system for reconnecting an emergency call in an enterprise.

FIG. 1 is a block diagram of a first illustrative system for reconnecting an emergency call in an enterprise. The first illustrative system 100 comprises communication endpoints 101A-101N, a network 110, a gateway 111, wireless networks 112A-112N, a session manager 120, an emergency call center 130 and a communication manager 140.

The communication endpoints 101A-101N can be or may include any hardware device that can communicate on the wireless networks 112A-112B (or wired networks), such as a cellular telephone, a Personal Digital Assistant (PDA), a tablet device, a notebook device, a laptop computer, a smart phone, a mobile device, a Personal Computer (PC), and/or the like. As shown in FIG. 1, any number of communication endpoints 101A-101N may be connected to the wireless networks 112A-112N, including only a single communication endpoint 101.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Transmission Communication Protocol (TCP), Session Initiation Protocol (SIP), Integrated Services Digital Network (ISDN), and the like. Thus, the network 110 is an electronic communication network configured to carry messages via packets and/or circuit switched communications.

The gateway 111 can be or may include any hardware coupled with software that can provide an interface between the networks 110 and the session manager 120/wireless networks 112A-112N, such as a Session Border Controller (SBC), a firewall, a Network Address Translator (NAT), and combination of these, and the like.

The wireless networks 112A-112N can be or may include any collection of communication equipment that can send and receive wireless electronic communications, such as, a cellular network, a WiFi network, an 802.11 network, a 4G network, a 3G network, a combination of these, and the like. The networks 112A-112N can use a variety of electronic protocols, such as 802.11, Wired Equivalent Privacy (WEP), WiFi Protected Access (WPA), WiFi Protected Access 2 (WPA2), Internet Protocol (IP), Transmission Communication Protocol (TCP), Session Initiation Protocol (SIP), and the like. Thus, the wireless networks 112A-112N are electronic communication networks configured to carry messages via wireless packets.

The wireless networks 112A-112N further comprises wireless base stations 113A-113N. The wireless base stations 113A-113N are hardware devices that can be or may include WiFi routers, WiFi hubs, cellular base stations, wireless access points, and/or the like. The wireless base stations 113A-113N allows the communication endpoints 101A-110N to communicate on the wireless networks 112A-112N.

The session manager 120 can be or may include any hardware coupled with software that can process voice and/or video communications, such as a Private Branch Exchange (PBX), a session manager, a router, a central office switch, a video switch, and/or the like. The session manager 120 further comprises a processor 121, an Address Resolution Protocol (ARP) process 122, and a SIP processor 123.

The processor 121 can be or may include any hardware processor that can process computer instructions, such as a microprocessor, a multi-core processor, a microcontroller, an application specific processor, a digital signaling processor, and/or the like.

The ARP process 122 can be or may include any hardware/software that can manage ARP communications with the communication endpoints 101A-101N. The ARP process 122 is shown in the session manager 120. However, the ARP process 122 may be in the wireless base stations 113A-113N or distributed between the session manager 120 wireless base stations 113A-113N. The ARP process of getting MAC addresses from the communication endpoint 101A-101N is based on the Network Working Group RFC 826 titled "An Ethernet Address Resolution Protocol or Converting Network Protocol Addresses to 48.bit Ethernet Addresses for Transmission on Ethernet Hardware," November 1982, and Network Working Group RFC 2390 titled "Inverse Address Resolution Protocol, September 1998, which are both incorporated herein in their entirety by reference.

The SIP processor 123 can be or may include any hardware/software that can process and/or manage SIP messages. The SIP processor 123 can process SIP messages for any number of SIP communication sessions. The SIP processor 123 may processes SIP messages using a multi-threaded process for different communication sessions.

The emergency call center 130 can be or may include any hardware contact center that is used to handle emergency calls, such as 911 calls in the United States. The emergency call center may be a Public Safety Access Point (PSAP). The emergency call center 130 may receive emergency calls for voice and/or video calls.

The communication manager 140 can be or may include any hardware coupled with software that can process voice and/or video communications, such as a Private Branch Exchange (PBX), a router, a central office switch, a video switch, and/or the like. In some embodiments, the session manger 120 and the communication manager 140 may be a common device.

Figure 2:
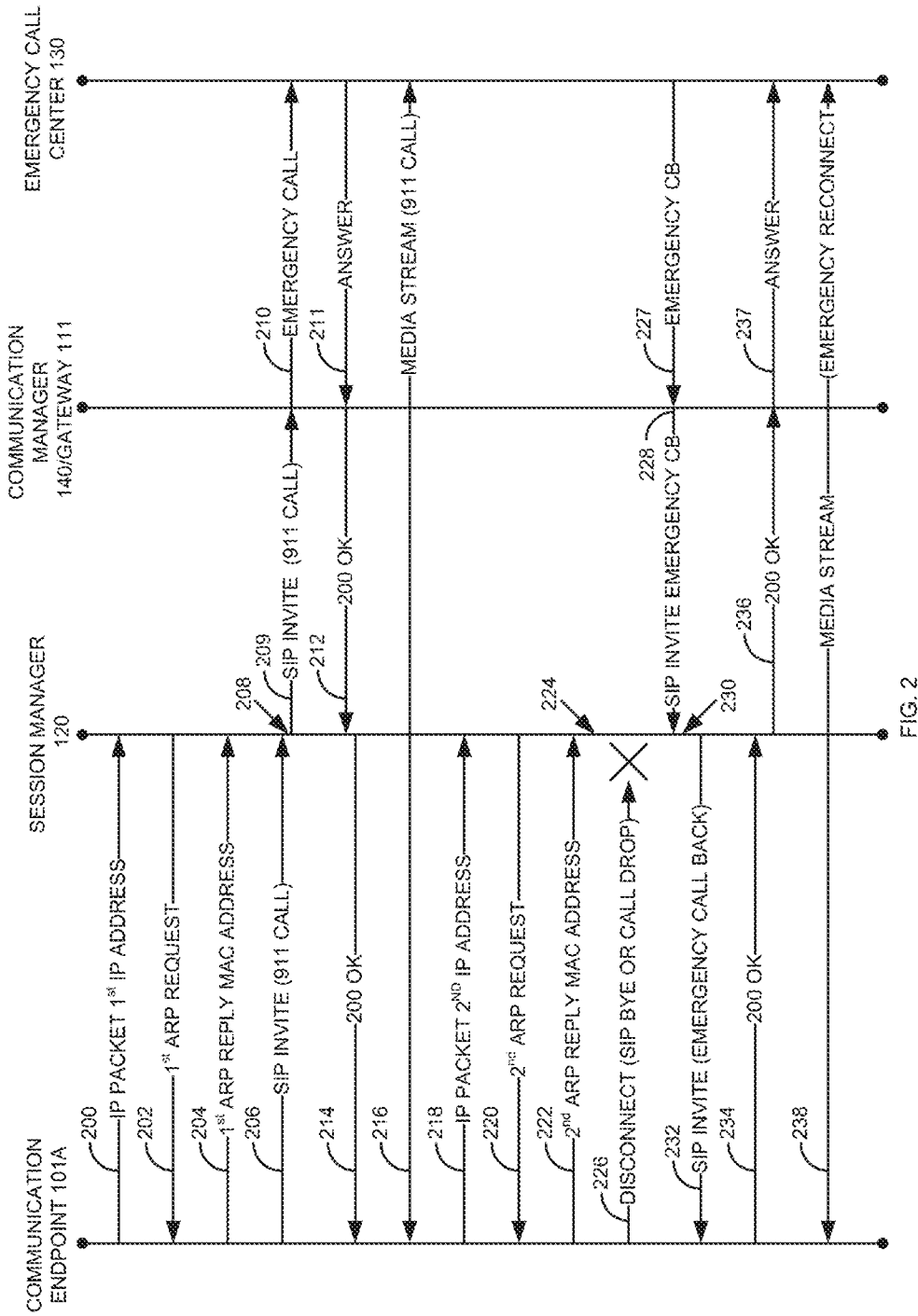
FIG. 2 is a flow diagram of a process for reconnecting an emergency call in an enterprise.

FIG. 2 is a flow diagram of a process for reconnecting an emergency call in an enterprise. Illustratively, the communication endpoints 101A-101N, the gateway 111, the wireless base stations 113A-113N, the session manager 120, the ARP process 122, SIP processor 123, the emergency call center 130, and the communication manager 140 are stored-program-controlled entities, such as a computer or processor, which performs the method of FIG. 2 and the processes described herein by executing program instructions stored in a computer readable storage medium, such as a memory or disk. Although the methods described in FIG. 2 are shown in a specific order, one of skill in the art would recognize that the steps in FIG. 2 may be implemented in different orders and/or be implemented in a multi-threaded environment. Moreover, various steps may be omitted or added based on implementation.

The process starts, in step 200, when the session manager 120 receives a first IP packet from the communication endpoint 101A. The communication endpoint 101A has been assigned a first IP address (e.g., a dynamic IP address received from a Dynamic Host Configuration Protocol (DHCP) server) that is sent in the first IP packet. The first IP packet may include a SIP message. For example, the first IP packet may be a SIP INVITE message (e.g., the SIP INVITE message of step 206).

In response to receiving the first IP packet, the ARP process 122 sends a first ARP request to the communication endpoint 101A in step 202. The process of sending the first ARP request of step 202 may be automatic, regardless of a state of current ARP table. For example, in traditional ARP (e.g., as defined in the ARP RFCs 826 and 2390), the ARP process builds a table and only sends out an ARP request if there is an not an entry for the IP address. The first ARP request of step 202 is to determine a MAC address (i.e., a hardware device) that is currently associated with the first IP address.

In one embodiment, the first ARP request of step 202 is only sent where the first IP packet includes a SIP message, which is different from traditional ARP. In this case, the ARP process 122 automatically sends the $1^{st}$ ARP request of step 202 based on receiving the IP packet of step 200 with the SIP message. In response, the communication endpoint 101A sends a first ARP reply with the communication endpoint 101A's MAC address in step 204. The SIP processor 123 associates the first IP address (from the first IP packet) with the MAC address of the communication endpoint 101A.

In one embodiment, the first ARP request of step 202 is sent automatically when the IP packet of step 200 is a SIP INVITE for an emergency call (i.e., the SIP INVITE of step 206). In this case, steps 202 and 204 will occur between steps 206 and 208.

The communication endpoint 101A sends a first SIP INVITE for an emergency call (an emergency call request) in step 206. The SIP processor 123 receives first SIP INVITE for the emergency call request in step 206. The SIP processor 123 associates, in step 208, the MAC address of the communication endpoint 101A to the SIP INVITE (the emergency call request) of step 206. The SIP processor 123 sends the SIP INVITE of step 206 to the communication manager 140/gateway 111 in step 209. In one embodiment, the first SIP INVITE of step 206 also includes the MAC address of the communication endpoint 101A. For example, the MAC address may be in a request URI.

The SIP INVITE also includes a SIP To: and a SIP From: fields in a SIP header. The SIP To: field will include an address of the emergency contact center 130. For example, the SIP To: field may comprise a Uniform Resource Identifier (URI) (e.g., emergency@statex.gov). The SIP From: field may be a URI for a user of the communication endpoint 101A (e.g., user@companyx.com). Alternatively, if a user has not authenticated, the From: field may be empty or be anonymous. The SIP To: and From: fields may be stored in step 208. In addition, other fields from the first SIP INVITE may be stored, such as a P-Asserted-id, a request URI that can be used to route the SIP INVITE in step 230.

The communication manager 140/gateway 111 sends the emergency call to the emergency call center 140 in step 210 (e.g., using the PSTN). The emergency contact center 130 responds by sending an answer in step 211. The messages of steps 210/211 are shown as being implemented in generic protocols. However the messages of steps 210 and 211 may be implemented with SIP INVITE/200 OK messages. In response to receiving the answer of step 211, the communication manager 140/gateway 11 sends a 200 OK message in step 212 to the session manager 120. The SIP 200 OK message of step 212 is forwarded by the SIP processor 123 to the communication endpoint 101A in step 214. Although not shown, the communication endpoint 101A sends a SIP ACK to the communication manager 120/gateway 111 via the session manager 120. This allows a media stream for the emergency call (e.g., a voice or video media stream) to be established between the communication endpoint 101A and the emergency contact center 130 in step 216.

The session manager 120 receives an IP packet from the communication endpoint 101A in step 218. The IP packet from the communication endpoint 101A in step 218 uses a second IP address that is different from the first IP address (the IP address of step 200). For example, the communication endpoint 101A may have reset and received a different dynamic IP address.

Alternatively, the IP packet with the second IP address may result when the communication endpoint 101A moves between the wireless networks 112A-112N. As the communication endpoint 101A moves from the wireless network 112A to the wireless network 112N (via the wireless base stations 113A-113N), the communication endpoint 101A may be assigned a different IP address on the wireless network 112N (e.g., an IP address from a range of dynamic IP addresses assigned to the wireless network 112N). As the communication endpoint 101A moves between the wireless networks 112A and 112N, the result may be that the established emergency call may prematurely disconnected. For example, the communication endpoint 101A may move into a dead spot between the wireless network 112A and 112N and then be later connected to the wireless network 112N.

In response to receiving the IP packet with the second IP address in step 218, the ARP process 122 sends a second ARP request, in step 220, to the communication endpoint 101A. The second ARP request of step 220 may be automatically sent, regardless of the state of any ARP tables in the ARP process 122. The second ARP request of step 220 is to determine a MAC address that is currently associated with the second IP address (in this case, the communication endpoint 101A). The communication endpoint 101A responds, in step 222, by sending an ARP reply with the MAC address of the communication endpoint 101A. The SIP processor 123 stores the MAC address of the communication endpoint 101A that is currently associated with the $2^{nd}$ IP address in step 224.

The emergency call is prematurely disconnected in step 226. The emergency call can disconnect in a standard way where the communication endpoint 101A sends a SIP BYE message to tear the emergency call down. A standard disconnect may be a result of a user accidently hanging up the emergency call or where the user is forced to hang up the emergency call. Alternatively, the emergency call can disconnect in step 212 in a non-standard fashion. For example, the communication link or the communication endpoint 101A may fail or reset (e.g., where the connection is lost when moving between wireless base stations 113A-113N).

In one embodiment, the disconnection of step 226 is the result of a SIP BYE message that may be the IP packet of step 218. The SIP BYE message may have the second IP address. When the SIP BYE message with the second IP address is received, the $2^{nd}$ ARP request is sent. In this case, steps 220 and 222 will occur after the SIP BYE message is reconceived in step 226.

One feature of 911 calling is an emergency call back feature. For example, if during a 911 call, the call is prematurely disconnected (either by a hang up or connection issue), the emergency call center 130 may instigate an emergency call back to try and re-establish the emergency call. The emergency call center 130 initiates the emergency call back, in step 227, to the communication manager 140/gateway 111. The communication manager 140/gateway 111 sends a SIP INVITE message, in step 228, to the session manager 120. The SIP INVITE message for the emergency call back, in step 228, is made using the first IP address of the communication endpoint 101A (received in the SIP INVITE of step 209). The SIP INVITE of step 228 may also include the MAC address of the communication endpoint 101A (from the SIP INVITE that was sent in step 206/209/210. The SIP processor 123, in step 230, determines that the IP address for the communication endpoint 101A in the SIP INVITE message of step 228 is no longer valid. The SIP processor 123 knows the current IP address of the communication endpoint 101A (the second IP address) based on IP address received in step 218 along with the associated MAC address received in step 222. In addition, the SIP processor may also compare a SIP To: field sent in step 209 to a captured SIP From: field of the SIP INVITE of step 228 to make sure the fields are the same (i.e., both are based on the emergency contact center 130).

If the MAC address of the communication endpoint 101A is in the SIP INVITE of step 228 (e.g., in the request URI), the session manager 120 will know the current IP address associated with the MAC address in the SIP INVITE of step 228, which was received in step 222.

The SIP INVITE of step 228 is routed to the communication endpoint 101A based on the current IP address (the second IP address) of the communication endpoint 101A in step 232. The SIP INVITE of step 228 is routed to the communication endpoint 101 regardless of whether a user is authenticated or not. The communication endpoint 101A sends a SIP 200 OK message in step 234. The SIP processor 123 forwards the SIP 200 OK message, in step 236, to the communication manager 140/gateway 111. The communication manager 140/gateway 111 sends an answer 237 to the emergency call center 130 in step 237. Although not shown, the communication manager/gateway sends a SIP ACK that is forwarded to the communication endpoint 101A to establish the emergency call back. The media stream (e.g., a voice or video stream) of the emergency call back call is then sent in step 238 (e.g., using RTP).

The messages of steps 227 and 237 are described using generic protocols. However, in some embodiments, the messages of step 227 and 237 can be a SIP INVITE/SIP 200 OK messages.

Although the above processes are described using SIP, the above processes may be adapted to use other protocols, such as H.323, Video protocols, and/or the like. For example, instead of sending SIP INVITE messages in steps 206, 210, 228, and 232, similar messages of other protocols (e.g., H.323) may be used.

The above process of using the second IP address to route the SIP INVITE of step 228 to the communication endpoint 101A may also be used to route out-of-dialog SIP messages to the communication endpoint 101A. For example, SIP out-of-dialog messages that use the first IP address, such as, SIP NOTIFY messages, SIP OPTIONS messages, SIP INFO messages, and/or the like can be routed to the communication endpoint 101A based on the second IP address associated with the MAC address of the communication endpoint 101A.

The above processes are discussed using ARP. However, embodiments may also use ARP scan to get the current IP address associated with the MAC address of the communication endpoint. In one embodiment, ARP scan is a Linux process that may be invoked using shell scripts.

The above processes are described where the communication endpoints 101A-101N use the wireless networks 112A-112N. However, in other embodiments, the communication endpoints 101A-101N may use wired networks that use dynamic IP addresses.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to a generic communication network 110 and a generic wireless communication networks 112A-112N. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway 111, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information.

Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods described herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An apparatus comprising:
   a microprocessor; and
   a computer readable medium, coupled with the microprocessor and comprising microprocessor readable and executable instructions that cause the microprocessor to:
      receive, from an Address Resolution Protocol (ARP) process, a first Internet Protocol (IP) address that is associated with a Media Access Control (MAC) address of a communication endpoint;

receive a first Session Initiation Protocol (SIP) INVITE that is an emergency call request from the communication endpoint;

send the first SIP INVITE to request the emergency call to a communication manager or a gateway;

receive, from the ARP process, a second IP address that is associated with the MAC address of the communication endpoint, receive a second SIP INVITE that is a request for an emergency call back from the communication manager or gateway, wherein the second SIP INVITE comprises the first IP address of the communication endpoint; and route the second SIP INVITE to the communication endpoint based on the second IP address associated with the MAC address of the communication endpoint.

2. The apparatus of claim 1, wherein the first IP address is from a first network and the second IP address is from a second network and wherein the first IP address is different from the second IP address.

3. The apparatus of claim 1, wherein the instructions cause the microprocessor to associate the MAC address with the emergency call.

4. The apparatus of claim 1, wherein the emergency call back request results from the communication endpoint moving between a first wireless network and a second wireless network, which causes a communication session for the emergency call to be disconnected prematurely.

5. The apparatus of claim 1, wherein the second SIP INVITE is routed to the communication endpoint based on sending the first SIP INVITE to request the emergency call.

6. The apparatus of claim 5, wherein the first SIP INVITE is sent regardless of whether a user is authenticated or not.

7. The apparatus of claim 1, wherein instructions cause the microprocessor to receive a SIP out-of-dialog message addressed to the communication endpoint using the first IP address and route the SIP out-of-dialog message to the communication endpoint using the second IP address.

8. The apparatus of claim 1, wherein the received first IP address is based on the first SIP INVITE and wherein a first ARP request is automatically sent in response to receiving the first SIP INVITE.

9. The apparatus of claim 8, wherein the first ARP request is automatically sent, regardless of a state of an ARP table for the ARP process.

10. The apparatus of claim 1, wherein the first SIP INVITE comprises the MAC address of the communication endpoint, wherein the second SIP INVITE comprises the MAC address of the communication endpoint, and wherein the instructions cause the microprocessor to use the MAC address of the communication endpoint to route the second SIP INVITE to the communication endpoint.

11. A method comprising:
receiving, by a processor, from an Address Resolution Protocol (ARP) process, a first Internet Protocol (IP) address that is associated with a Media Access Control (MAC) address of a communication endpoint;

receiving, by the processor, a first Session Initiation Protocol (SIP) INVITE that is an emergency call request from the communication endpoint;

sending, by the processor, the first SIP INVITE to request the emergency call to a communication manager or a gateway;

receiving, by the processor, from the ARP process, a second IP address that is associated with the MAC address of the communication endpoint;

receiving, by the processor and from the communication manager or gateway, a second SIP INVITE that is a request for an emergency call back, wherein the second SIP INVITE comprises the first IP address of the communication endpoint; and routing, by the processor, the second SIP INVITE to the communication endpoint based on the second IP address associated with the MAC address of the communication endpoint.

12. The method of claim 11, wherein the processor associates the MAC address with the emergency call.

13. The method of claim 11, wherein the emergency call back request results from the communication endpoint moving between a first wireless network and a second wireless network, which causes a communication session for the emergency call to be disconnected prematurely.

14. The method of claim 11, wherein the second SIP INVITE is routed to the communication endpoint based on sending the first SIP INVITE to request the emergency call.

15. The method of claim 11, wherein the first ARP request is automatically sent, regardless of a state of an ARP table for the ARP process.

16. The method of claim 11, wherein the received second IP address associated with the MAC address is in an IP packet with a SIP BYE message for the emergency call.

17. The method of claim 11, wherein the received first IP address associated with the MAC address is in an IP packet with a SIP message and wherein a first ARP request is sent automatically in response to the IP packet comprising the SIP message.

18. The method of claim 11, wherein the processor receives a SIP out-of-dialog message addressed to the communication endpoint using the first IP address and routes the SIP out-of-dialog message to the communication endpoint using the second IP address.

19. The method of claim 11, wherein the first SIP INVITE comprises the MAC address of the communication endpoint, wherein the second SIP INVITE comprises the MAC address of the communication endpoint, and wherein the processor uses the MAC address of the communication endpoint to route the second SIP INVITE to the communication endpoint.

20. An apparatus comprising:
a microprocessor; and
a computer readable medium, coupled with the microprocessor and comprising microprocessor readable and executable instructions that cause the microprocessor to:
a first Internet Protocol (IP) address associated with a Media Access Control (MAC) address of a communication endpoint;
receive an emergency call request from the communication endpoint;
send the emergency call request to a communication manager or gateway,
receive a second IP address associated with the MAC address of the communication endpoint;
receive, from the communication manager or gateway, a request for an emergency call back; and
route the request for the emergency call back to the communication endpoint based on the second IP address associated with the MAC address of the communication endpoint.

* * * * *

UNITED STATES PATENT AND TRADEMARK OFFICE
CERTIFICATE OF CORRECTION

PATENT NO. : 9,979,754 B2  
APPLICATION NO. : 15/053160  
DATED : May 22, 2018  
INVENTOR(S) : Harsh V. Mendiratta, Manish Chatterjee and Purnendu Dhal It is certified that error appears in the above-identified patent and that said Letters Patent is hereby corrected as shown below:

In the Claims

At Column 12, Line 49, please insert --receive-- before --a first Internet Protocol (IP) address--.

Signed and Sealed this  
Fourth Day of September, 2018

Andrei Iancu  
*Director of the United States Patent and Trademark Office*